W. C. ROBINSON.
LANDING CHASSIS FOR AEROPLANES.
APPLICATION FILED MAR. 27, 1916.

1,240,371.

Patented Sept. 18, 1917.

Witness
A. G. Hague

Inventor
William C. Robinson
by Crwig & Bair
Attys.

UNITED STATES PATENT OFFICE.

WILLIAM C. ROBINSON, OF GRINNELL, IOWA.

LANDING-CHASSIS FOR AEROPLANES.

1,240,371.

Specification of Letters Patent. Patented Sept. 18, 1917.

Application filed March 27, 1916. Serial No. 87,117.

*To all whom it may concern:*

Be it known that I, WILLIAM C. ROBINSON, a citizen of the United States, and resident of Grinnell, in the county of Poweshiek and State of Iowa, have invented a certain new and useful Landing-Chassis for Aeroplanes, of which the following is a specification.

The object of my invention is to provide a landing chassis for aeroplanes of simple, and inexpensive construction, and in which there will be sufficient elasticity or resiliency to avoid excessive shocks or jars to the aeroplane when making ordinary landings, and at the same time will be rigid enough so that in starting the aeroplane over comparatively rough surfaces there will not be so much elasticity or spring in the landing chassis to cause the aeroplane to be lifted or bounced off of the ground surface.

A further object is to provide means for adjusting the springs of the landing chassis whereby the proper or desired amount of elasticity or spring for the landing chassis may be obtained under varying conditions.

Figure 1:
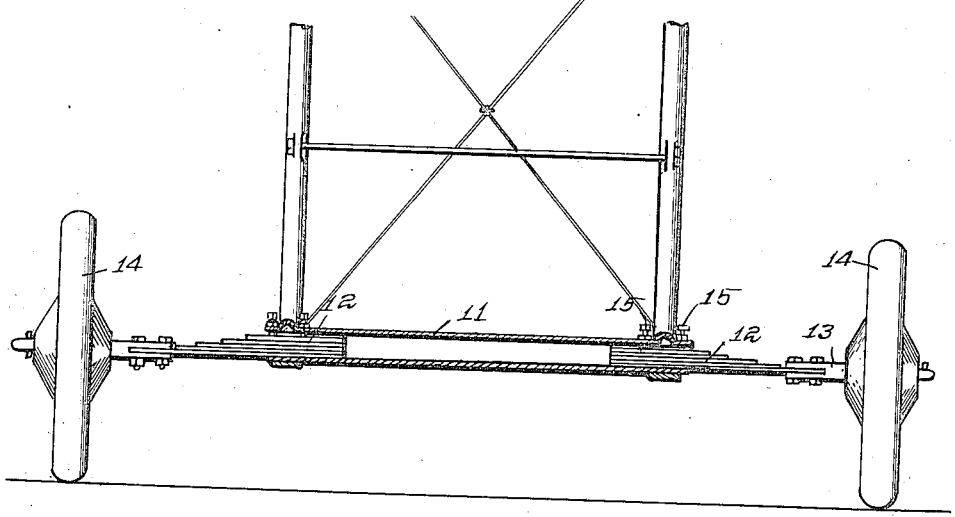
Figure 2:
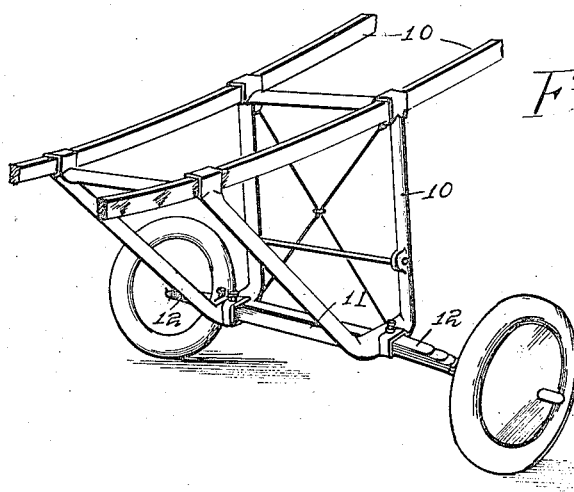

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a front elevation of the landing chassis embodying my invention, the central tubular portion of the axle being shown in section, and Fig. 2 shows a perspective view of a landing chassis embodying my invention.

Referring to the accompanying drawings, I have used the reference numeral 10 to indicate a portion of an aeroplane frame. Firmly fixed to this frame is a hollow axle portion 11 open at both ends.

Inserted in the open ends of the hollow axle portion 11 are the spring axle members 12, each of which is preferably composed of a series of layers of spring metal, thus forming an ordinary laminated spring. At the outer end of each spring axle member 12 is a solid axle 13 upon which a supporting wheel 14 is rotatably mounted.

The spring axle members 12 are detachably held in place within the ends of the hollow axle member 11 by means of set screws 15 seated in the hollow axle member and engaging the tops of the spring axle members 12. This arrangement also provides for an adjustment of the spring axle members within the hollow axle member. The inner ends of the spring axle members stand spaced apart a considerable distance within the hollow axle member.

In practical use it is obvious that a very simple and inexpensive structure is provided, because the hollow axle member can be rigidly and immovably connected with the other parts of the aeroplane chassis. Furthermore, the spring axle members are relatively inexpensive because they are of comparatively short length. It is also a simple and easy operation to connect the spring axle members with the hollow axle member, because all that is necessary is to insert the spring axle members in the ends of the hollow axle member and then adjust the set screws 15.

I have found that by providing an axle made up of a rigid central portion and spring end portions, I can obtain a proper amount of elasticity or spring to relieve the chassis from excessive shocks and jars when landing, and at the same time I avoid too much elasticity or spring such as would be occasioned if the entire axle were made of spring material and the chassis secured thereto. I have found in practice that when relatively long springs are used on a landing chassis of this class, there is considerable difficulty in starting the aeroplane over rough and uneven ground surfaces, because when such long springs are used for the supporting wheels there is a tendency when the wheel strikes an obstruction on the ground for the long spring to tilt or throw the aeroplane upwardly from the ground before sufficient speed has been attained by the aeroplane for supporting it in the air.

Another advantage of my construction is that the length of the spring portions of the axle relative to the rigid portion is readily adjustable so that an axle may be provided, having just the right amount of resiliency for different conditions as to the weight being carried in the aeroplane and as to the condition of the ground surface from which the start and landing is made.

I claim as my invention:

1. An improved aeroplane landing chassis comprising a rigid axle portion, two spring axle members, wheels thereon and means for adjustably securing the spring axle members on said rigid axle portion for supporting the wheels at different positions of the adjustment of said spring axle members.

2. An improved aeroplane landing chassis comprising a rigid tubular axle member having open ends, two laminated spring axle members inserted in the open ends of the tubular axle member, means for adjustably and detachably securing the spring axle members in position, and supporting wheels on the outer ends of said spring axle members, for the purposes stated.

Des Moines, Iowa, March 1, 1916.

WILLIAM C. ROBINSON.